Sept. 17, 1946.  A. MEYER  2,407,893
NAVIGATOR
Filed Oct. 13, 1943  2 Sheets-Sheet 1

INVENTOR.
Albert Meyer:
BY
Victor J. Evans & Co.
ATTORNEYS

Sept. 17, 1946.                A. MEYER                2,407,893
                               NAVIGATOR
                         Filed Oct. 13, 1943           2 Sheets-Sheet 2

INVENTOR.
Albert Meyer:
BY
Victor J. Evans & Co.
ATTORNEYS

Patented Sept. 17, 1946

2,407,893

UNITED STATES PATENT OFFICE 2,407,893

NAVIGATOR

Albert Meyer, Albuquerque, N. Mex.

Application October 13, 1943, Serial No. 506,111

2 Claims. (Cl. 33—1)

This invention has for its object the provision of a practical, compact, sturdy and durable navigational calculating instrument for use in restricted and confined areas such as the cockpit of the ordinary plane.

Another object of this invention is to provide a calculating instrument that will readily solve any or all known navigation problems incident to cross country flying under all conditions of travel.

Another object of this invention is to provide a calculating instrument affording an erasable surface which can be used repeatedly for the purpose of plotting any number of consecutive courses, bearings, etc., without detracting from its original usefulness.

Another object of this invention is to eliminate the use of a number of separate tools, instruments, charts etc., by solving any and all problems known to navigation with the use of this compact, self-computing instrument, solely by its adaptation for use with standard Government charts as issued for this purpose.

In the accompanying drawings, which form a part of this specification the invention is illustrated as follows.

Figure 1:
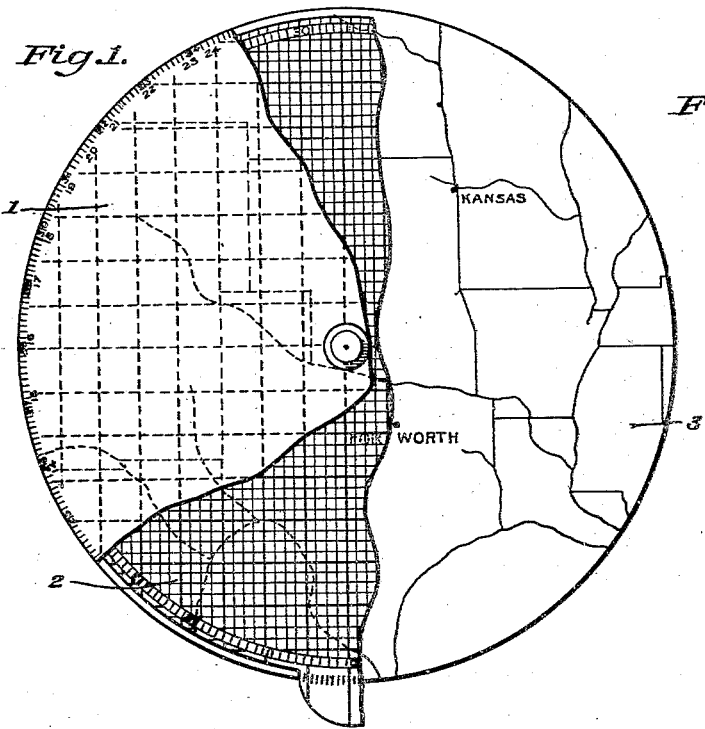
Figure 1 is a top plan view of the assembled invention showing the upper circular transparent discs superimposed over a standard, dimensioned to scale, navigation charts.
Figure 5:
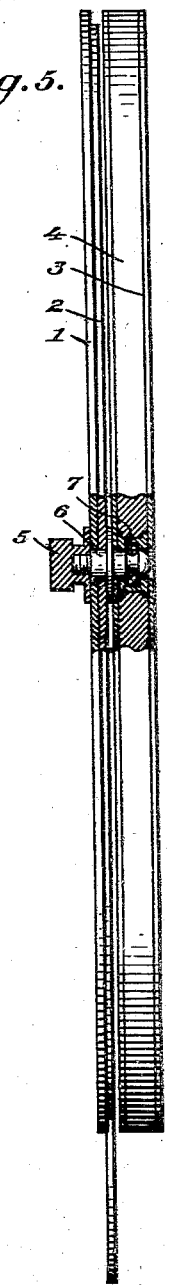
Figure 5 is a side elevation of the assembled invention.
Figure 2:
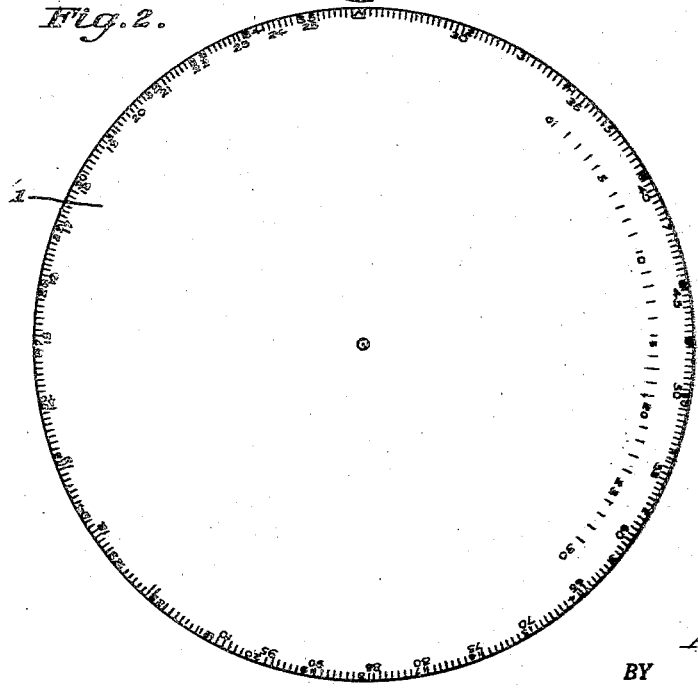
Figure 2 is plan view of top disc of circular transparent material graduated circumferentially along its outer edge.
Figure 3:
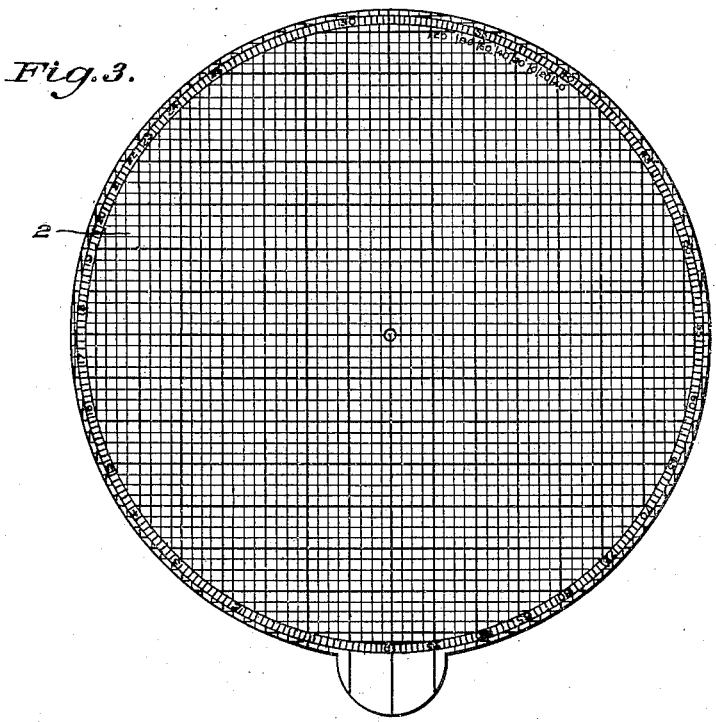
Figure 3 is a plan view of a circular disc of transparent material graduated circumferentially along its outer edge and etched with longitudinal and transverse lines spaced to form one inch squares upon its surface.
Figure 4:
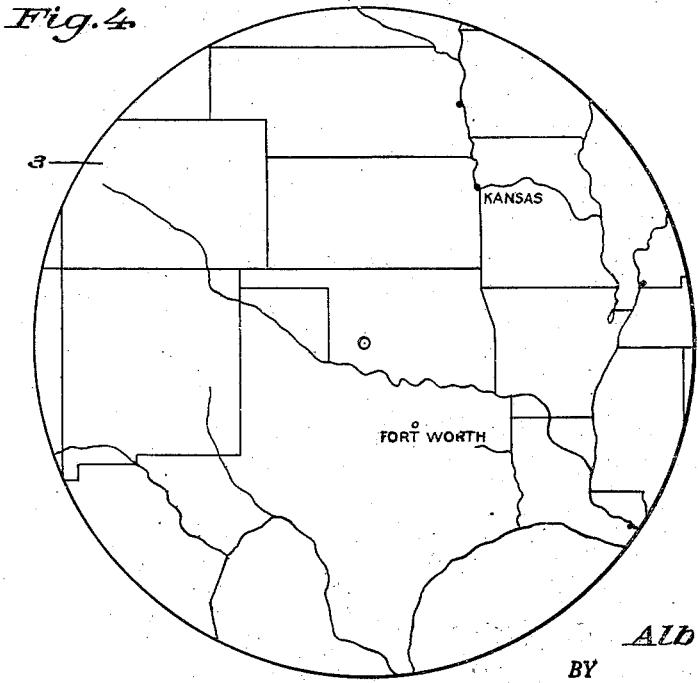
Figure 4 is a plan view of a standard dimensioned chart, or portion thereof as commonly accepted for air navigation purposes, mounted on a circular plate of fibre or other suitable material.

In the foregoing drawings 1 is a circular transparent disc of pyralin or other transparent material having a somewhat roughened surface to facilitate legible plotting and drawing upon its surface and lending itself to erasures thereon either by an eraser or by wiping with a damp cloth. The disc is perforated at its exact center with a circular hole of any predetermined dimension to allow fastening to and upon the lower sections of the instrument. The said disc is graduated circumferentially along its outer edge with equally dimensioned graduations from 0 to 36 representing a circle of 360°. Another circular graduation is etched on the face of the disc just within and adjacent to the outer graduation with indicating scales of temperature, airspeed, etc.

A similar transparent disc 2 with corresponding central circular hole for mounting upon instrument and immediately under disc 1 is graduated circumferentially at its outer edge from 0 to 100 and perpendicular lines are provided upon its face longitudinally and transversely to form blocks approximately one inch square. A disc 4 of fibre and of thickness sufficient to afford complete rigidity containing a circular central opening for mounting below and under discs 1 and 2 is provided as a base upon which is to be pasted or otherwise attached standard dimensioned working air charts as found in common daily use.

Discs 1, 2 and 4 are secured together, 2 being superimposed over 4 and 1 being placed above the others forming the top or plotting face of the instrument and all are secured together by means of stud 6 passing thru the central openings of the discs from the bottom and loosely secured by thumb nut 5 at the top. Stud 6 is retained within the fibre disc by means of contact with a pre-inserted spring 7 within the section of the fibre disc 4 as shown in contact with milled groove at the bottom end of stud.

What is claimed is:

1. In a navigation calculating instrument one transparent washable disc of pyralin or other suitable material graduated circumferentially around its outer edge and having a circular hole or opening at its center for mounting upon its companion disc, a companion disc of like transparent material arranged for mounting through a central opening below the upper disc and being graduated circumferentially along its outer edge and having lines approximately 1 inch square etched upon its face, a disc of fibre or other material of the same circular dimensions as its companion transparent discs and having a circular hole at its center containing a retaining spring for the purpose of holding and retaining a central mounting stud upon which companion transparent discs are mounted, a stud or bolt retained in fibre disc and extending thru central openings of transparent super-imposed discs said discs being retained in position on stud by a thumb nut screwed to stud from top.

2. In a navigation calculating instrument, comprising two transparent graduated discs superimposed upon a base disc of fibre, a stud mounted centrally of said base disc, a spring for retaining said stud in said base disc, and said first mentioned discs being retained thereon by said stud, a thumb nut secured loosely in contact with the outer disc on the top of the stud, said base disc constructed for securing a section of map thereto, the outer transparent disc roughened whereby it may be written upon and erased.

ALBERT MEYER.